(12) United States Patent
Tobler et al.

(10) Patent No.: US 6,646,220 B2
(45) Date of Patent: Nov. 11, 2003

(54) DEVICE AND METHOD OF GUIDING A PROCESSING ELECTRODE IN A MACHINE TOOL

(75) Inventors: Karl Tobler, Maggia (CH); Peter Wehrli, Ascona (CH)

(73) Assignee: Agie SA, Losone (CH)

( * ) Notice: Subject to any disclaimer, the term of this patent is extended or adjusted under 35 U.S.C. 154(b) by 0 days.

(21) Appl. No.: 10/004,992

(22) Filed: Dec. 4, 2001

(65) Prior Publication Data

US 2002/0079293 A1 Jun. 27, 2002

(30) Foreign Application Priority Data

Dec. 22, 2000 (DE) .......................................... 100 64 232

(51) Int. Cl.⁷ ................................................ B23H 7/10
(52) U.S. Cl. ...................... 219/69.12; 226/91; 226/97.1
(58) Field of Search ............................ 219/69.12, 69.14; 226/97.1, 91

(56) References Cited

U.S. PATENT DOCUMENTS

| | | | |
|---|---|---|---|
| 1,746,196 A | * 2/1930 | Langmuir et al. | |
| 3,891,819 A | 6/1975 | Ullmann et al. | 219/69.17 |
| 3,987,270 A | 10/1976 | Ullmann et al. | 219/69.12 |
| 3,999,695 A | * 12/1976 | Bradley et al. | 226/91 |
| 4,465,915 A | 8/1984 | Corcelle | 219/69.12 |
| 4,634,825 A | 1/1987 | Budin et al. | 219/69.12 |
| 4,740,667 A | * 4/1988 | Obara | 219/69.12 |
| 5,055,649 A | 10/1991 | Iwasaki et al. | 219/69.12 |
| 5,428,200 A | 6/1995 | Lodetti | 219/69.12 |

FOREIGN PATENT DOCUMENTS

| | | | |
|---|---|---|---|
| CH | 559 599 | 3/1975 | |
| DE | 31 26 444 C2 | 5/1982 | |
| DE | 34 19 628 C2 | 11/1985 | |
| DE | 40 09 450 C2 | 11/1990 | |
| DE | 94 21 952 U1 | 8/1997 | |
| DE | 199 63 416.5 | 12/1999 | |
| EP | 0 233 297 B1 | 8/1987 | |
| EP | 0 585 714 B1 | 3/1994 | |
| JP | 60-213421 | 10/1985 | |
| JP | 62-19327 A | * 1/1987 | 219/69.12 |
| JP | 63-102832 | 5/1988 | |
| JP | 63-256314 A | * 10/1988 | |
| JP | 7-308824 A | * 11/1995 | |
| JP | 10-180547 | 7/1998 | |
| WO | WO 84/04066 | 10/1984 | |

* cited by examiner

*Primary Examiner*—Geoffrey S. Evans
(74) *Attorney, Agent, or Firm*—Marshall, Gerstein & Borun LLP

(57) ABSTRACT

Devices and methods for threading a wire electrode in a wire erosion machine are disclosed. A feed-through channel is provided for producing a fluid jet within which the machining electrode is guided. One or more control devices are provided for varying the cross section of the feed-through channel and, thus, the cross section of the fluid jet.

20 Claims, 1 Drawing Sheet

DEVICE AND METHOD OF GUIDING A PROCESSING ELECTRODE IN A MACHINE TOOL

FIELD OF THE INVENTION

This invention relates generally to machine tools, and more particularly to a device and a method of guiding a machining electrode in a machine tool.

BACKGROUND OF THE INVENTION

A wide variety of machine tools for machining work pieces are known. One example that can be mentioned here is a spark erosion machine, such as a wire erosion machine, which generally has the following design elements: (a) a machine frame with drive devices and a guidance system for a wire electrode, (b) a rinsing system, (c) a generator and (d) a numeric control. In wire erosion, a first electrode (the eroder wire) is used to cut a contour into or out of a second electrode (the work piece), starting from a starting bore or a reference surface. In doing so, the wire electrode is guided in an upper wire guidance head (i.e., arranged above the work piece) and a lower wire guidance head (i.e., arranged beneath the work piece). The wire running system is usually designed so that the wire electrode is continuously drawn off a supply roll, conveyed over a conveyance distance to the working zone and conveyed through the working zone between the guide heads and then disposed of. The wire running system and the machine control ensure a suitable wire draw-off speed and a suitable mechanical wire tension.

One problem of a special type exists with such machine tools. Specifically, due to the fact that before the actual machining, the machining electrode must be threaded with great precision in the working zone of the machine (i.e., the end of a wire-shaped machining electrode (wire electrode), for example, must be guided from the upper wire guidance head through a starting bore or a working gap in a work piece to be machined toward the lower wire guidance head). However, it is often necessary to thread a new wire electrode into the system during machining. This is the case, for example, when the overall machining is composed of multiple closed contours, in a case when closed contours are cut in several partial sections, or when different wire electrodes are used. In addition, it is possible for a wire to break during operation (e.g., in the case when there are problems in rinsing or when the materials of the wire electrode or the work piece are not homogeneous), which can lead to a concentration of discharges and, thus, to local mechanical and thermal overloading of the wire electrode.

To increase operating efficiency, automatic wire systems are preferred in modern wire erosion machines. Manual threading of the wire electrode can be performed only with great effort on wire erosion machines that operate with fine or extremely fine wire electrodes, because the wire is hardly visible and has practically no inherent stiffness. However, the automatic threading systems known in the state of the art do not completely meet the requirements of modern machine tools, especially in variable machining situations.

Mechanical methods were used in the past. In these methods, a wire electrode was conveyed by movable means from one wire guidance head to the other.

Swiss Patent 559,599 by the present applicant described, as early as 1973, a wire threading method in which the wire electrode can be guided with the help of a free concentric fluid jet (such as a high pressure jet of water), to overcome the distance from the upper wire guidance head to the lower wire guidance head. This constituted a considerable advance in automation of wire erosion machines. A similar method was described later in German Patent 3,126,444 C2. In this method, a suction effect is created at the outlet end of a starting bore in the work piece, thus forming a suction flow of the transport fluid at the entrance end of the bore, leading to intake of the wire. In the case of several starting bores in a work piece located close together, however, this yields the problem of threading the wire into a certain starting bore in a controlled manner.

To perform an optimal and reliable threading operation, different threading elements are necessary for different types of wire to produce a suitable threading jet. For example, the present applicant uses a number of adapted threading nozzles such as those described in German Utility Model 9,421,952 U1, to produce a fluid jet having different diameters of the jet for threading the wire electrode. These nozzles are inserted manually by the operator into the upper wire guide head. When working with different grades of wire, manual intervention is necessary in order to change nozzles.

Another automatic wire threading method is also known from European Patent 233,297 B1, where a separate threading device, which is connected to the upper wire guide head in an articulated manner, is used. For threading the wire, the upper wire guidance head is lifted and the wire threading device, which is equipped with a nozzle to produce a fluid jet, is pivoted into the wire guidance area. However, in the case of different grades of wire, especially with different wire diameters, it is often necessary to change the threading nozzle as well. In addition, another disadvantage is that a complicated mechanical wire threading device is necessary, which takes up a lot of space in the work room. A portion of the traversing distance of the Z axis is lost due to the upstream connection of the wire threading device. In addition, the pivoting movements of the wire threading device before and after threading the wire cause an increased risk of collision with the work piece or the chucking means in the working zone.

An additional challenge in guidance of a machining electrode through a fluid jet, especially for automatic threading, is the fact that only a satisfactory beam geometry guarantees reliable guidance of the electrode and thus a reliable threading operation. Even a minor disturbance can result in destruction of the fluid jet and thus to failure of the threading operation. For example, if the fluid jet comes in contact with the surface of the work piece, the inside wall of a starting bore or some other obstacle the threading operation may fail. The requirements of the automatic threading operation in the case of machine tools, especially in the case of wire erosion machines, have increased considerably over the decades. An example of this is the threading operations required with the contours of male and female molds, which have become increasingly more like filigree or open work and are to be produced by means of EDM or wire erosion. The finest wire electrodes in use today have a diameter of a few hundredths of a millimeter. The dimensions of the starting bore are also becoming smaller and smaller, so that they take up less space. Accordingly, the requirements of automatic threading have also increased as well. The diameter of a fluid jet used for this purpose should therefore be only slightly larger than the diameter of the wire electrode transported. Wire erosion machines, which are generally used universally, are usually operated with different grades of wire and wire diameters, depending on the application. Therefore, there is a need for adapting or optimizing the threading operation to different machining situations.

Although a wire threading fluid jet may give satisfactory threading results with a thin wire, for example, the same fluid jet may under some circumstances be unsuitable for a thicker wire. In principle, this is true not only of threading operations but in general for conveyance operations in which a machining electrode is conveyed with the help of a concentric fluid yet.

OVERVIEW OF THE ILLUSTRATED DEVICE AND METHOD

The disclosed device and method for guiding a machining electrode are suitable for a broad spectrum of machining electrodes and/or machining situations. In particular, they provide a wire electrode threading device and a corresponding threading method that are suitable for various threading situations.

More specifically, the disclosed device for guiding a machining electrode such as a wire or strip electrode in a machine tool with the help of a fluid jet includes a feed-through channel for producing a fluid jet within which the machining electrode is guided, and one or more control devices for varying the cross section of the feed-through channel and, thus, the cross section of the fluid jet.

As mentioned above, only a satisfactory fluid jet geometry which is adapted to the respective machining electrode to be conveyed through the machine can guarantee reliable guidance of the machining electrode. The present inventors have recognized that the fluid jet diameter used in each case plays a crucial role. With the help of the device described herein, it is possible to adapt the cross section of the fluid jet to a broad spectrum of conveyance situations without otherwise having to intervene in the electrode transport system of the machine. Use of the disclosed guidance device for automatic threading of a machining electrode in a wire erosion machine is especially advantageous, because the device can be used universally for various threading situations with respect to the wire diameter, the diameter of the starting bore or the working gap width, the height of the work piece and/or other conditions involving the work piece.

The illustrated electrode guidance device is designed with a feed-through channel having a variable size. For threading a wire electrode in a wire erosion machine, the variable feed-through channel is in an area of the upper wire guidance head through which the wire electrode and a fluid under pressure are guided. The means for adjusting the feed-through channel and, thus, the threading jet cross section can be implemented in various ways, as will be explained in greater detail below. The control device or each control device preferably has at least one rigid control element which is movable in the feed-through channel to vary the cross section. This may be a linear or rotational control movement or a combination of the two. The control element is preferably inserted into the feed-through channel at the side, especially transversely. Alternatively, the control element is moved vertically (axially) or quasi-vertically relative to the feed-through channel.

The preferred embodiments have the advantage that the fluid jet, which directs the machining electrode in the desired direction as if between guide boards, can be optimally adapted to the diameter of the machining electrode used, the diameter of the starting bore in the work piece, the height of the work piece, etc. by varying the dimension of the feed-through channel. In the case of wire erosion in particular, wire electrodes having a wide variety of diameters are used in practice, depending on the type of erosion process and the material to be cut, especially in a diameter range of 0.03 mm to 0.35 mm. The adjustability of the fluid jet made possible by the device disclosed herein guarantees for each type of electrode an unambiguous and geometrically controllable conveyance position, in particular a threading position of the machining electrode with respect to the work piece to be machined. Under some circumstances, by varying the cross section of the fluid jet, the conveyance suction exerted by the fluid jet on the machining electrode can be varied to permit a controlled influence on the conveyance precision, in particular the precision in threading the wire electrode. Specifically, it is possible with the disclosed device to adapt the threading condition for different wire erosion types and different cutting types so that the tip of the wire electrode assumes a defined position with respect to a starting bore or a working gap in a work piece, so that responsible threading of the wire electrode is guaranteed. This has been possible in the past only by replacing the conventional wire threading nozzle by another suitable nozzle. In the manner disclosed herein wire electrode threading operations are readily possible even in an extremely inclined position of the wire guidance head.

To guarantee the most extensive possible automation in machining, the electrode guidance device is preferably combined with a controller (preferably a CNC controller), of the machine tool for automatically varying the cross section of the feed-through channel as a function of the type of machining electrode and/or the conditions pertaining to the work piece (e.g., the diameter and type of machining electrode, the diameter of a starting bore or the working gap in the work piece, the height of the work piece and/or other conditions involving the work piece).

A method of automatically threading a machining electrode in the form of a wire or strip into a wire erosion machine is also disclosed, where the cross section of the wire threading fluid jet is automatically adjusted as a function of the type of machining electrode and/or the conditions prevailing on the work piece (e.g., the diameter and type of the machining electrode, the diameter of a starting bore or a working gap in the work piece, the height of the work piece and other conditions pertaining to the work piece).

The disclosed wire threading method is preferably combined with a method of automatically changing the machining electrode by using an automatic electrode changer. For example, in the case of a wire erosion machine, an automatic wire changing device is provided, such as that described in German Patent Application 19,963,416.5, the disclosure of which is hereby incorporated by reference in its entirety. At least two devices are provided here for processing wire electrodes from the devices holding a selected wire electrode which is unwound from a storage roll and bringing the wire electrode into a suitable position (in the operating state) for feeding it into the electrode running system of the machine and then releasing the respective selected machining electrode.

In another example, a combination of the disclosed wire threading method with a conventional fluid jet wire threading method is also conceivable. Such an approach is based on the use of a standard nozzle which serves as the wire threading element to produce a fixed threading jet. In this way it is possible to operate in at least two threading modes, namely a standard threading mode with a fixed fluid jet produced with the standard nozzle, and a fine jet mode in which a suitable fine threading jet for extremely fine wire electrodes can be produced with the adjustable electrode guidance device, for example.

DETAILED DESCRIPTION OF THE PREFERRED EXAMPLES

The disclosed guidance device is described below in conjunction with the operation of threading a wire electrode in a wire erosion machine. However, the device should not be understood as restricted to use in such operations or to such type of machines, because the guidance device is also suitable for guiding or deflecting a wire electrode in other sections of a wire running system of a wire erosion machine, and is also suitable for guiding machine electrodes on other types of machine tools, such as a micro erosion machines. In addition, the terminology used below has been chosen to facilitate readability, but this is not to be understood as restrictive in any way. For example, the terms "above" and "below" used herein refer to the arrangement of the wire guidance heads of a wire erosion machine in the usual operating installation (i.e., with a vertical alignment above and below a work piece). Moreover, the same reference numbers are used for parts having the same function in all figures.

Figure 1:
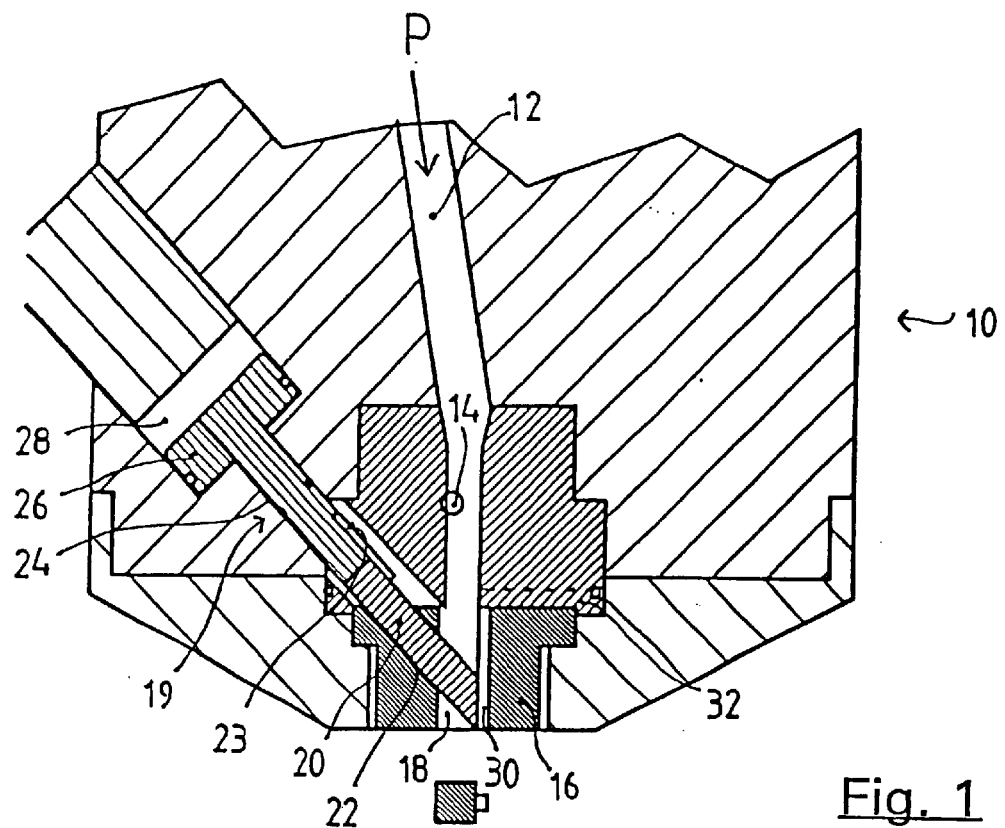
FIG. 1 is a sectional view of a part of an upper wire guidance head of a wire erosion machine having a wire threading device constructed in accordance with the teachings of the invention, and shown in the throttled state.
Figure 2:
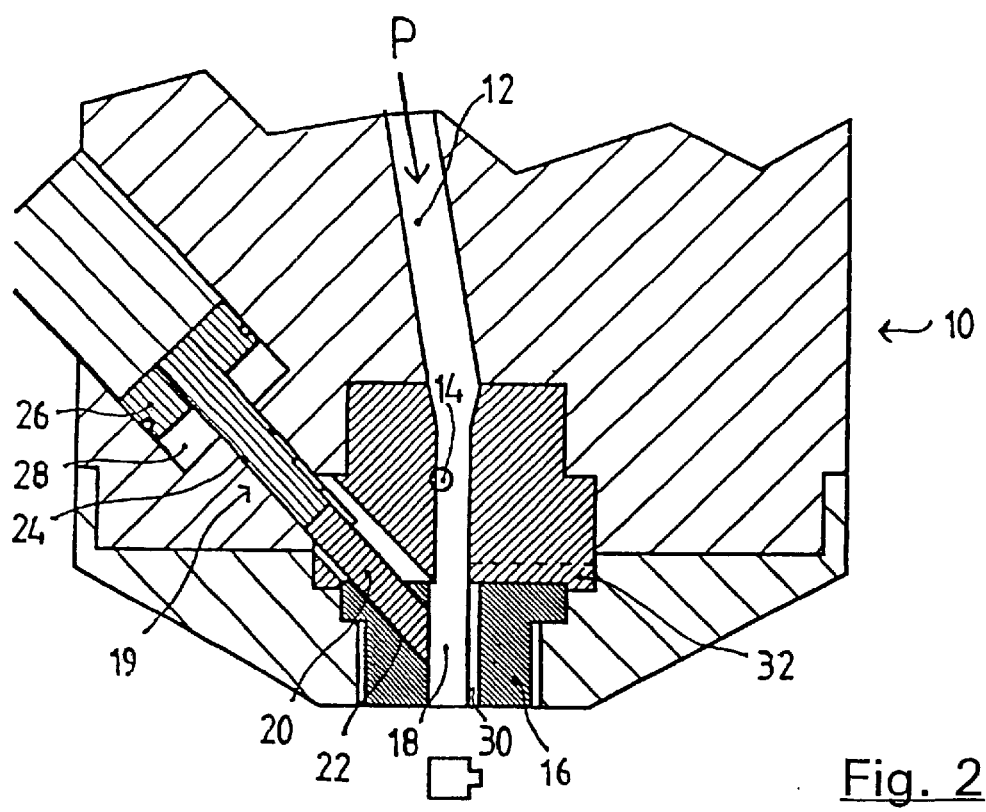
FIG. 2 is a sectional view of the device of FIG. 1 with the wire threading device shown in the opened state.

FIGS. 1 and 2 each show a longitudinal sectional view through a portion of an upper wire guidance head 10 of a wire erosion machine on which a wire electrode is guided above a work piece (not shown here) which is to be machined. The figures are limited to a purely schematic diagram of some parts of the guidance head. Other basic elements such as the power supply, the rinsing system, etc. are not shown here because they are assumed to be self-evident. The arrow P shown in the figures indicates schematically the direction of feed of a wire electrode which is guided from top to bottom in the direction of the working zone through the wire guidance head 10. In doing so, the wire electrode enters the wire passage 12 of the wire guidance head 10 at the top, passes by a power supply unit (not shown), and continues on past a wire guidance element 14, and finally comes out at the lower end of the wire guidance head 10 through a nozzle 16. Then the wire electrode passes through a work piece (not shown here) in the working zone of the machine to a lower wire guidance head, which is arranged symmetrically with the upper wire guidance head with respect to the work piece.

The wire guidance element 14 here is a so-called open wire guidance such as a V guide or a toroidal guide, such as that described by the present applicant in European Patent 585,714 (which is hereby incorporated herein by reference in its entirety), where the wire electrode is in contact with the guide during machining and, thus, has a definite and controllable position with respect to the work piece to be machined. The same guidance element is provided in the lower wire guidance head (not shown here). Such an open wire guidance has the advantage that it is suitable for wire electrodes having different diameters, and furthermore, automatic passage of the wire electrode through the wire guidance head is less complicated than is the case with a closed guide.

The nozzle 16 on the lower end of the upper wire guidance head 10 is used to produce a fluid jet directed toward the work piece. In the illustrated device, purified processing fluid such as deionized water is directed in a known manner under a high pressure by means of a high pressure pump toward the upper wire guidance head 10 and toward the nozzle 16 through rinsing connections (not shown), so that a concentrated high pressure fluid jet is discharged from the nozzle 16 in the direction of the work piece. A feed-through channel 18 of the nozzle 16 forms the extension of the wire passage 12 in the guidance head 10 and has a substantially square cross section with a side length of a few millimeters. In the illustrated device, the nozzle 16 initially has the function of a rinsing nozzle to produce a fluid jet for rinsing the working gap in the manner of so-called coaxial rinsing. The rinsing jet geometry and the cross section of the spray jet are determined by the geometry of the feed-through channel 18 of the nozzle 16. However, the fluid jet produced in the process can also be used equally well for threading thicker wire electrodes which are guided in the concentric fluid jet from the upper wire guidance head to the lower wire guidance head through a large starting bore in a work piece.

For threading fine wire electrodes, a closing means 19 is provided for at least partially closing the cross section of the feed-through channel 18 of the nozzle to thereby reduce its size to produce a finer wire threading fluid jet. The closing means 19 has for this purpose a movable pin-shaped slide element 20 which can be displaced into the feed-through channel 18 and back out of it on a guide 22, which is inclined with respect to the feed-through channel 18. The guidance channel 22 passes through a rear portion of the nozzle 16 at an oblique angle and then continues in another guidance channel 24 which is designed in a section of the wire guidance head 10 or other components connected upstream from the nozzle 16.

The slide element 20 is operated by a pneumatic actuator. For this purpose, the slide element 20 is attached to the extension of a piston 26 which is accommodated in the guide 24. The piston 26 is displaceably guided in a cylindrical cavity 28 in a portion of the wire guidance head 10. The piston 26 is operated with compressed air in a known manner. A compressed air inlet and outlet line (not shown) is provided for this purpose in the wire guidance head 10. In the disclosed device, the closing means and the respective actuator are completely integrated into the wire guidance head 10, so that operation of the same does not constitute any hindrance or any additional operating risk. However, an actuator connected from the outside is also conceivable. Furthermore, actuator means are also preferably used for operation of closing means 19 (e.g., hydraulic and electric actuators). It is especially preferable to use actuators operated with water or air, because these resources are already available with a conventional wire erosion machine, and furthermore they do not constitute any safety problems in the work area. One or more springs 23 (see FIG. 1) are preferably also provided for returning the adjustable slide element 20 back to its resting position (i.e., to completely release the feed-through channel 18). However, this return can also be accomplished by using only the actuators described above.

The actuator for adjusting the slide element 20 is connected to the CNC control of the wire erosion machine and is controlled by the CNC controller to produce the desired wire threading fluid jet. This setting can also be accomplished automatically as a function of certain operating conditions, such as the diameter and material of the wire electrode, the diameter of a starting bore or a working gap in the work piece, the height of the work piece and other conditions on the work piece, as explained in greater detail below.

To produce a fine wire threading jet, an axially parallel additional channel 30 is provided in the feed-through channel 18 on the inside of the nozzle 16 opposite the slide element 20. The additional channel has a much smaller cross section than the feed-through channel 18. Thus, on the whole, the cross section of the feed-through channel 18 has a groove-like recess. The overall cross-sectional shape is illustrated schematically in FIGS. 1 and 2 at the outlet of the wire guidance head 10. The cross-sectional shape of the additional channel 30 is shown here as a quadrilateral shape, but it may also be triangular, or it may have any other shape, but it is preferably at least partially round. It is also conceivable to have channel designs which develop continuously from a first shape, such as a rhomboid shape, into a second shape such as a circle along channel 30 in order to produce the desired jet geometry. As an alternative, such an additional channel could also be designed on the end face of the slide element 20, or it could be designed in part on the nozzle 16 and in part on the end face of the slide element 20.

The closing means 19 then works together with the additional channel 30 of the nozzle 16 so that when the slide element 20 is extracted as far as the stop in the feed-through channel 18, the feed-through channel 18 is completely sealed off, and only the additional channel 30 remains open. This status is illustrated in FIG. 1. This status is also represented symbolically by dotted lines in the illustration of the cross sections of the main channel 18 and the additional channel 30 in FIG. 1. In the (closed) state of the closing means 19, the wire electrode, which is guided through the wire guidance head 10, and the fluid supplied to nozzle 16 can pass only through the additional channel 30, so that a certain fine fluid jet comes out of the outlet of the nozzle 16. The fluid jet is determined by the dimensions of the additional channel 30 and the wire is guided within the fluid jet. This causes the wire electrode to be deflected into a certain position starting from the wire guidance head 10, and the position of the wire electrode with respect to a starting bore in a work piece, for example, is determined precisely. This fine fluid jet is suitable for threading fine and extremely fine wire electrodes having a diameter in the range of approximately 0.03 to 0.20 mm into small starting bores which may also be arranged close together.

In a simple example, two positions of the closing means 19 are possible, namely a retracted (open) position, as illustrated in FIG. 2, in which the feed-through channel 18 is completely open and is used to produce a coaxial rinsing jet as explained above, and a closed position in which only the remaining cross section of the additional channel 30 remains free for producing a wire threading jet for fine wire electrodes. The closing means 19, namely, the end face of the slide element 20 and the inside of the feed-through channel 18 are adapted to one another, so that clean and definite flow conditions can be established with these operating settings. Furthermore, the lower edge of the rod-shaped slide element 20 is located in the plane of the outlet edge of the additional channel 30 to produce a largely homogeneous free fluid jet. This guarantees in particular in the threading mode that no lateral flow losses can occur. In addition to the accurate fit of the above-mentioned fine jet shaping elements, suitable seals are preferably also used.

In contrast with the known arrangements which work with a standard wire threading nozzle and a separate traditional rinsing nozzle, the wire threading function and the rinsing function here are implemented through a single nozzle 16. Furthermore, the illustrated device yields the advantage in comparison with the known arrangements that nozzle 16, which is operated in the threading mode, can be arranged in direct proximity in front of the work piece surface during operation, whereas the conventional standard wire threading nozzle cannot be in contact with the front edge of the wire guidance head because of the deflection of the wire electrode in the case of a conical section, but instead it is offset toward the rear, which has a negative effect on the precision of the wire threading jet at the site of the starting bore.

However, the closing means 19 is preferably adjustable in any other position between the two extreme positions mentioned above in which the feed-through channel 18 is only partially closed and produces a wire threading fluid jet with a moderate cross-sectional size. By operation of the closing means 19, a fluid channel whose cross-sectional size is adjustable as desired is formed, so that a suitable wire threading jet can be produced. Thus, this yields a type of adjustable wire threading nozzle.

In the example described above, the closing means 19 is implemented by the interaction of the pneumatically operated slide element 20 and the nozzle 16. The usual rinsing nozzle of a conventional wire guidance arrangement may preferably be used as the nozzle 16. In this way, the rinsing nozzle can be used in combination with the closing means 19 in addition to a wire threading nozzle which can be used for a wide variety of wire electrodes and/or starting bore situations. However, because a change in the cross section of the wire passage in an area of the upper wire guidance head 10 is present in the illustrated example to produce a corresponding change in the cross section of the fluid jet, other embodiments of the closing element are also conceivable to persons of ordinary skill in the art. According to one example, the closing means is preferably implemented by the wire cutters which are usually provided in an upper wire guidance head and are indicated schematically with reference number 32 in FIG. 1. The wire cutters 32 comprise a cutting means which is displaceable across the direction of travel of the wire and with which the wire electrode can be cut (e.g., before a wire threading operation after a wire break). However, the cross section of the wire passage 12 in the upper wire guidance head 10 can be reduced equally well with these cutting means which are movable in the transverse direction, so that the cross section of a fluid jet supplied in this area can be reduced accordingly. Unlike the diagram in FIG. 1, it would of course be more favorable for such wire cutters to be arranged on the lower end of the wire guidance head 10.

In another preferred example, the inside wall of the wire passage 12 is preferably at least partially elastic or preferably has one or more flexible elements (preferably in the outlet area of the wire guidance head 10). The elastic elements reduce the cross section of the wire passage 12 by operation of an actuator behind the wall and, thus, reducing the cross section of a fluid jet supplied in this area. The elastic section of the wire passage 12, thus, acts as the closing means.

In another preferred example, the closing means comprises two or more moving parts which are adjustable, for example, in the manner of an optical aperture across the wire passage 12 to reduce the wire passage opening.

The functioning of the wire threading device as illustrated in FIGS. 1 and 2 is described below. The case of a small starting bore (which may be one of many adjacent bores, for example) is assumed here. The position of the starting bore is generally known by the CNC control of the wire erosion machine because it is preferably manufactured by other machine tools such as a laser machine or by using other suitable means on the same wire erosion machine, such as microerosion. In addition, automatic searching methods are also known for determining the precise position of a starting bore which can preferably be used in combination with the automatic wire threading method for automation of the entire machining operation. In addition, through manual input or automatic detection, the CNC control will usually also know such parameters as the height of the work piece, the position and location of the work piece, the position of the starting bore and the diameter of the machining electrode. The position of the tip of the wire electrode in the wire running system of the machine can also be determined automatically (e.g., with the help of detectors mounted in the wire running system). In addition, a wire diameter of 0.05 mm is assumed. For wire threading or rethreading such a fine wire electrode, it is preferably guided automatically to the upper wire guidance head 10 (e.g., all the way to an upper power supply unit). Then the upper and lower wire guidance heads are positioned with respect to the starting bore to be threaded in such a way that the center of the feed-through channel of the nozzle 16 corresponds to the center of the starting bore. This position is then corrected for the offset between the position of the wire electrode in a vertical passage and the center of the additional channel. Thus, the center of the additional channel 30 is arranged exactly above the center of the starting bore. This offset is then stored as a constant in the machine control. Then the closing means 19 is automatically operated by the machine control to close the feed-through channel 18 of the nozzle 16 except for the additional channel 30. Then the fluid is supplied under pressure into the nozzle 16 to produce the desired fine wire threading jet. As the next step, the wire running system drives the wire electrode so that the tip of the wire penetrates into the resulting remaining cross section of the additional channel 30 and is shifted into the fine threading jet coming out of the wire guidance head 10, guiding the wire electrode into the starting bore like guide planks. In the starting bore the tip of the wire is guided further by the fluid jet, and the wire electrode leaves the work piece at the outlet end of the bore, and after a short free distance it enters the lower wire guidance head within which the wire electrode is conveyed further likewise with the help of a conveyance fluid. Thus the wire threading operation is concluded. Preferably additional fluid chambers are provided between the work piece and the wire guidance heads so that a fluid flow which entrains the electrode is formed in the starting bore.

In the case of thicker wire electrodes and/or larger starting bores, the closing means is operated so that the feed-through channel 18 of the nozzle 16 is only partially closed to produce a wire threading jet having a larger cross section.

In another preferred example, the additional channel 30 in the nozzle 16 is dimensioned so tightly that the slide element 20 slightly pinches the wire electrode in the closed position. In a first phase of the threading of the wire electrode into a starting bore, the wire guidance head 10 with the pinched wire electrode is moved in the Z direction to the work piece until the wire has reached the starting bore. Then the wire electrode is released for further fluid-supported threading. For this purpose, the upper wire guidance head must of course be removed previously a slight distance away from the surface of the work piece. In order for the wire electrode not to be damaged or deformed in this pinching operation, the slide element 20, the nozzle 16 or both preferably have an elastic contact layer.

However, it is also conceivable for a wire threading method to be combined with a standard wire threading method in which a wire threading jet with a fixed cross section is produced with a standard wire threading nozzle. Such a standard wire threading nozzle would be arranged, for example, in the upper wire guidance head 10 in front of the nozzle 16 as seen in the direction of travel of the wire in FIG. 1. In this combination method, the wire threading nozzle 16 which is throttle according to FIG. 1 is used to produce a fine jet in the case of fine wires and in the case of thicker wires the standard wire threading nozzle is used with the closing means 19 being completely opened as in FIG. 2, so that the wire electrode is inserted only with the conventional wire threading nozzle. The one threading mode or the other is selected according to the machining function and the situation prevailing on the work piece, namely, as a function of the threading site, specifically the starting bore, outside a work piece, in a stepped-down plane, in a cutting gap, in proximity to an adjacent starting bore or in proximity to a work piece edge. If the starting bore is large enough or in the case of considerable work piece heights, the combination method is preferably operated in the standard threading mode because the resulting threading jet is sufficient for most situations. In the case of small bores and fine wires, the fine jet mode is sufficient.

What is claimed is:

1. A device for threading a machine electrode in a wire erosion machine comprising:
   a feed-through channel for producing a fluid jet within which the machining electrode is guided, the feed-through channel having a cross-section; and
   a control device for varying the cross section of the feed-through channel and, thus, the cross section of the fluid jet.

2. A device as defined in claim 1, wherein the device is associated with a wire guidance head located in front of a work piece in the direction of travel of the machine electrode.

3. A device as defined in claim 2, wherein the feed-through channel is located in the wire guidance head, and the control device is located in the feed-through channel to vary the cross section of the feed-through channel.

4. A device as defined in claim 1 wherein the control device has at least one rigid control element which can be moved into the feed-through channel to vary the cross section.

5. A device as defined in claim 1, wherein the control device comprises closing means for selectively partially closing the feed-through channel for adjusting the cross section.

6. A device as defined in claim 1 wherein an additional channel is located in at least one of: (a) adjacent the feed-through channel and (b) on an end face of the control device, the additional channel having a smaller cross section than the feed-through channel and the additional channel remaining substantially open when the control device is closed.

7. A device for guiding a machining electrode in a machine tool comprising:
   a feed-through channel for producing a fluid jet within which the machining electrode is guided, the feed-through channel having a cross-section;
   a control device for varying the cross section of the feed-through channel and, thus, the cross section of the fluid jet;
   an additional channel located in at least one of: (a) adjacent the feed-through channel and (b) on an end face of the control device, the additional channel having a smaller cross section than the feed-through channel and the additional channel remaining substantially open when the control device is closed; and
   wherein the additional channel has a cross-sectional shape which varies steadily from an entrance to an outlet of the additional channel.

8. A device for guiding a machining electrode in a machine tool comprising:
- a feed-through channel for producing a fluid jet within which the machining electrode is guided, the feed-through channel having a cross-section; and
- a control device for varying the cross section of the feed-through channel and, thus, the cross section of the fluid jet; and
- further comprising a rinsing nozzle having a nozzle opening and wherein the control device comprises a displaceable slide element which can be selectively inserted into the nozzle opening of the rinsing nozzle.

9. A device for guiding a machining electrode in a machine tool comprising:
- a feed-through channel for producing a fluid jet within which the machining electrode is guided, the feed-through channel having a cross-section;
- a control device for varying the cross section of the feed-through channel and, thus, the cross section of the fluid jet; and
- wherein the control device comprises a wire cutter which is movable in a transverse direction relative to the feed-through channel.

10. A device for guiding a machining electrode in a machine tool comprising:
- a feed-through channel for producing a fluid jet within which the machining electrode is guided, the feed-through channel having a cross-section;
- a control device for varying the cross section of the feed-through channel and, thus, the cross section of the fluid jet; and
- wherein the control device comprises at least two parts that are movable toward one another.

11. A device for guiding a machining electrode in a machine tool comprising:
- a feed-through channel for producing a fluid jet within which the machining electrode is guided, the feed-through channel having a cross-section; and
- a control device for varying the cross section of the feed-through channel and, thus, the cross section of the fluid jet;
- wherein the control device comprises an actuator which is controllable by a controller of the machine tool.

12. A device as defined in claim 11, wherein the actuator comprises one or more of the group comprising: a pneumatic actuator, a hydraulic actuator, an electric actuator, an air-driven actuator, and a water-driven actuator.

13. A device for guiding a machining electrode in a machine tool comprising:
- a feed-through channel for producing a fluid jet within which the machining electrode is guided, the feed-through channel having a cross-section; and
- a control device for varying the cross section of the feed-through channel and, thus, the cross section of the fluid jet, the control device having at least one rigid control element which can be moved into the feed-through channel to vary the cross section; and
- further comprising a spring which biases the control element toward a resting position.

14. A device for guiding a machining electrode in a machine tool comprising:
- a feed-through channel for producing a fluid jet within which the machining electrode is guided, the feed-through channel having a cross-section; and
- a control device for varying the cross section of the feed-through channel and, thus, the cross section of the fluid jet; and
- wherein the control device is in communication with a controller of the machine tool, and the controller controls the control device to automatically change the cross section of the fluid jet as a function of at least one of a kind of machining electrode and conditions on the work piece.

15. A device for guiding a machining electrode in a machine tool comprising:
- a feed-through channel for producing a fluid jet within which the machining electrode is guided, the feed-through channel having a cross-section; and
- a control device for varying the cross section of the feed-through channel and, thus, the cross section of the fluid jet;
- wherein the control device comprises closing means for selectively partially closing the feed-through channel for adjusting the cross section, and
- wherein the device has a threading mode where the closing means at least partially closes the feed-through channel and a rinsing mode where the closing means does not close the feed-through channel.

16. A method of automatically threading a machining electrode in a machine tool comprising:
- (a) moving a control device to change a cross-section of a channel based on at least one of: (i) a kind of machine electrode to be threaded, (ii) a size of machine electrode to be threaded, (iii) a size of a starting bore in a workpiece, (iv) a size of a working gap in a workpiece, and (v) a dimension of a workpiece; and
- (b) supplying a fluid jet through the channel to thread the machine electrode.

17. A method as defined in claim 16, further comprising:
- (c) employing a wire threading nozzle with a fixed fluid jet to thread the machine electrode; and
- (d) performing steps (a) and (b) if a first condition is met and performing step (c) instead of steps (a) and (b) if the first condition is not met.

18. A method as defined in claim 16, further comprising:
- (c) automatically changing the machining electrode using an automatic electrode changer.

19. A method as defined in claim 16, further comprising:
- (c) automatically detecting a position of the machine electrode in a wire running system of the machine tool.

20. A method as defined in claim 16, further comprising:
- (c) pinching the machine electrode in a wire guidance head via the control device; and
- (d) in a first phase of threading the machine electrode into a starting bore, moving the wire guidance head together with the second machine electrode toward a work piece until the machine electrode has reached the starting bore.

* * * * *